7609X
S. S. Allen,
Horse Power.
Patented June 29, 1833.
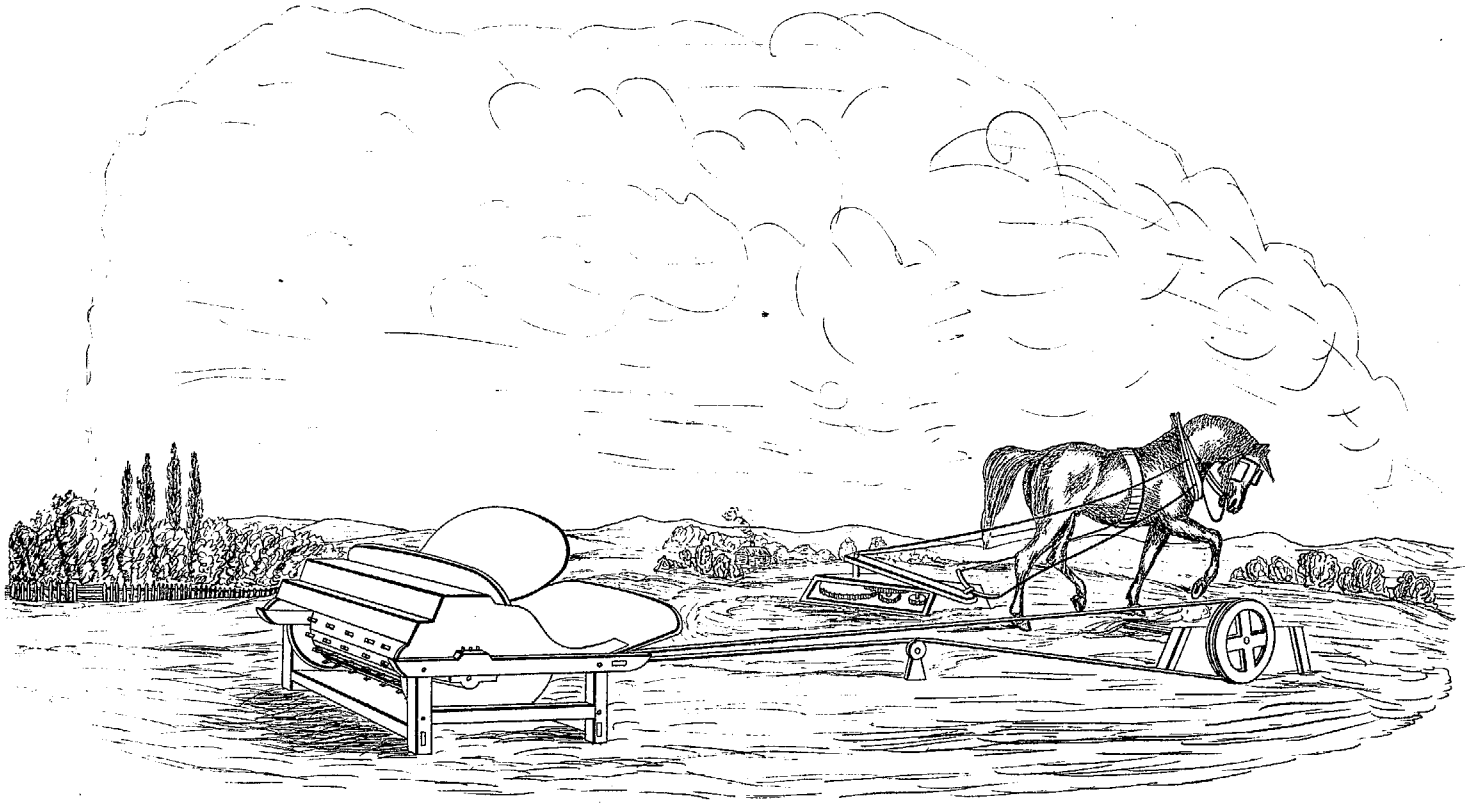
AM. PHOTO-LITHO. CO. N.Y. (OSBORNE'S PROCESS)

Samuel S. Allen's Horse Power
Letters Patent

The Schedule referred to in these Letters Patent and making part of the same containing a description in the words of the said Samuel S. Allen himself of his improvement in the machine called a Horse Power To all whom it may concern Be it known that I Samuel S. Allen of Saratoga Springs in the County of Saratoga and State of New York, have invented an improved mode of constructing the Machine usually called a horse power and that the following is a full and exact description thereof. The Horse power which I employ is intended to be portable & is so constructed that it may be readily transported from one place to another, and which receives its motion from a lever, or sweep, drawn round by the walking of the horse in a circle. Although I do not intend to confine myself to any precise size in any of the various parts I shall for the sake of description, give the proportions which I have found to answer well in practice. I make a frame or box about six feet long and sixteen inches in height. The end pieces of 4 inch plank, three feet long at their lower edges, and two feet 8 inches at their upper. The sides therefore slope in about two inches. The sides may be of two inch plank and must be securely fastened to the ends. This box is to contain the driving wheels and pinions, on three vertical shafts, running in suitable boxes. To receive these boxes and sustain the wheels, pieces of timber extend along the upper and lower sides of the box. The upper piece may be 3 by 8 inches flush with the top and mortised and keyed through the ends. One of its edges must reach just to the centre of the box, as the upper bearings or boxes of the shafts are to be fastened thereto. The lower timber is three by nine inches and twelve feet long, as it is to extend six feet without the box, being secured to one end of it like the upper timber, and notched in, and secured to the other end. The shaft of the first driving wheel may be about 4 inches square and extend above the top timber about 6 inches, where it is a little tapered to receive the lever or sweep, to which the horse is to be geared. This shaft is made of cast iron and has a flat disk or flanch cast on it, to which the arms of the wheel, to be presently described, are secured.

The 7609X 6/29/1833

[illegible]

The wheel is about thirty in diameter and stands near to the lower end of the
shaft. The second driving wheel is about 26 inches in diameter, it stands
above the first driving wheel, and has on its a shaft a pinion of about one fourth
of the size of the first wheel which mashes into it. The third shaft has a pinion
of about one fifth of the size of the second wheel, which mashes into it. On the
lower end of this third shaft there is a bevil or crown wheel, which may be
about 24 inches in diameter, its teeth project downward, and mash into a
pinion about one fifth of its size. This pinion is fixed upon an iron shaft
which runs horizontally near to the ground, and extends along the lower tim-
ber, six feet without the box or frame, and carries on its extreme end a
whirl of eighteen inches in diameter, from which a band extends to a thresh-
ing Machine small grist mill, or any other Machinery to which such a
horse power is adapted. To receive this horizontal shaft, the edge of the
sill, or projecting piece of timber is rebated, or hollowed out on its under
side, by which means it is protected from injury by the feet of the horse,
or from any other cause. Instead of making the lower or sill timber, in
one piece, it may be made to unship near to the box, and be removed along
with the horizontal shaft, when required. The wheels before named, con-
sist of cast iron rims with arms made of wood. These arms are formed
of two pieces of hard stuff crossed, halved together in the middle, the tim-
ber should be about 3 by 8 inches. The shaft passes through a mortise in
the centre of the arms, and they are secured by bolts to the flanches, or disks,
upon the shafts, the ends of the arms may then be turned off to fit the inner
part of the rim of the wheel. the rims are strengthened by a flanch which
projects inwards serving as a bearing for the arms and also to bolt them to,
a projection is cast on each side of the arms, within the rims to confine
them in width, and secure them from splitting; when the horse power is
to be used, it is placed upon the ground, in which it will be necessary
to make a small excavation to receive the lower part of the wheel. Four
stakes are to be driven into the ground at the four corners of the box, and two
chains tightened on these by means of wedges, passing over the box, near
each end, will render it perfectly secure. What I claim as new and
as my invention, is the manner of making these wheels as before mentioned
and

6/29/1833 1609X with wooden arms and cast iron rims, by which means they are afforded
cheaper, are lighter and may be more easily repaired in the case of the
breaking of a cog), than when the whole is made of cast iron, I also claim
the manner of securing the horizontal shaft from injury (and so that the
horse may pass over it, with little or no obstruction.

Witnesses
Thos. P. Jones
Jos. Andrews

Samuel S. Allen [illegible]
[illegible]

Patented June 29th 1833.

1020 [illegible] (Dr. in Port folio)